United States Patent
Guo et al.

(10) Patent No.: US 11,698,056 B2
(45) Date of Patent: Jul. 11, 2023

(54) DAMPER POSITION-LIMITING DEVICE, TOWER AND WIND TURBINE

(71) Applicant: BEIJING GOLDWIND SCIENCE & CREATION WINDPOWER EQUIPMENT CO., LTD., Beijing (CN)

(72) Inventors: Dadong Guo, Beijing (CN); Donghua Shan, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 896 days.

(21) Appl. No.: 16/481,423

(22) PCT Filed: Sep. 18, 2018

(86) PCT No.: PCT/CN2018/106209
§ 371 (c)(1),
(2) Date: Jul. 26, 2019

(87) PCT Pub. No.: WO2019/232975
PCT Pub. Date: Dec. 12, 2019

(65) Prior Publication Data
US 2021/0332798 A1 Oct. 28, 2021

(30) Foreign Application Priority Data
Jun. 7, 2018 (CN) .......................... 201810577873.7

(51) Int. Cl.
*F03D 80/00* (2016.01)
*F03D 13/20* (2016.01)
(Continued)

(52) U.S. Cl.
CPC ............. *F03D 80/00* (2016.05); *F03D 13/20* (2016.05); *F16F 15/08* (2013.01); *F03D 80/88* (2016.05);
(Continued)

(58) Field of Classification Search
CPC .......... F03D 80/00; F03D 13/20; F03D 80/88; F16F 15/08; F05B 2240/912; F05B 2260/964
See application file for complete search history.

(56) References Cited

U.S. PATENT DOCUMENTS 6,672,837 B1 * 1/2004 Veldkamp ................. F16F 7/10
416/500
7,928,593 B2 * 4/2011 Ollgaard ................. F03D 80/00
416/18
(Continued)

FOREIGN PATENT DOCUMENTS

CN 1771392 A * 5/2006 ............ F03D 13/20
CN 1771392 A 5/2006
(Continued)

OTHER PUBLICATIONS

The International Search Report dated Feb. 27, 2019; PCT/CN2018/106209.
(Continued)

*Primary Examiner* — Courtney D Heinle
*Assistant Examiner* — Ryan C Clark

(57) ABSTRACT

A damper position-limiting device is provided, which is mounted in a tower to limit the swing amplitude of a damper installed in the tower. The damper position-limiting device includes at least one web and a position-limiting ring. The web is provided with a mounting hole and at least one stress relief hole. A first side wall of the web has a first specified length along a circumferential direction of the inner wall of
(Continued)

the tower, and is connected to the inner wall of the tower. The position-limiting ring is positioned within the mounting hole and connected to the mounting hole and is configured to accommodate an impacting plate of the damper.

18 Claims, 4 Drawing Sheets

(51) Int. Cl.
  *F16F 15/08* (2006.01)
  *F03D 80/80* (2016.01)
(52) U.S. Cl.
  CPC ... *F05B 2240/912* (2013.01); *F05B 2260/964* (2013.01)

(56) References Cited

U.S. PATENT DOCUMENTS

| | | | |
|---|---|---|---|
| 10,400,754 B2 * | 9/2019 | Rodriguez Tsouroukdissian | F16F 15/02 |
| 2004/0244326 A1 | 12/2004 | Ollgaard | |
| 2009/0142178 A1 * | 6/2009 | Nieuwenhuizen | F03D 13/22 415/2.1 |
| 2010/0314883 A1 | 12/2010 | Ollgaard | |
| 2011/0056151 A1 * | 3/2011 | Marmo | E02D 27/42 52/651.01 |
| 2012/0121413 A1 * | 5/2012 | Rodriguez Tsouroukdissian | F03D 7/02 416/31 |
| 2016/0215754 A1 * | 7/2016 | Seidel | F03D 80/00 |
| 2016/0252079 A1 * | 9/2016 | Ollgaard | F03D 80/88 52/745.17 |
| 2018/0017125 A1 * | 1/2018 | Amdisen | F03D 13/20 |
| 2019/0129163 A1 * | 5/2019 | Van Lierop | F16F 1/185 |
| 2019/0360471 A1 * | 11/2019 | Øllgaard | F16F 7/10 |
| 2020/0271183 A1 * | 8/2020 | Jiang | F16F 15/08 |
| 2020/0355166 A1 * | 11/2020 | Mortensen | F03D 80/00 |

FOREIGN PATENT DOCUMENTS

| | | | | |
|---|---|---|---|---|
| CN | 102434404 A | | 5/2012 | |
| CN | 101874159 B | | 12/2012 | |
| CN | 103452747 A | | 12/2013 | |
| CN | 105298198 A | | 2/2016 | |
| CN | 105757161 A | | 7/2016 | |
| CN | 107620675 A | * | 1/2018 | |
| CN | 107620675 A | | 1/2018 | |
| CN | 207315575 U | | 5/2018 | |
| CN | 207315575 U | * | 5/2018 | |
| DE | 102011101271 A1 | * | 11/2012 | F03D 13/20 |
| EP | 1008747 A2 | | 6/2000 | |
| EP | 2215356 A2 | | 8/2010 | |
| EP | 2378118 A2 | | 10/2011 | |
| EP | 3269997 A1 | | 1/2018 | |
| WO | 2009068599 A2 | | 4/2009 | |
| WO | 2015/062608 A1 | | 5/2015 | |

OTHER PUBLICATIONS

Second Australian Office Action Application No. 2018400528; dated Jul. 10, 2020.
European Search Report dated May 29, 2020; Application No. 18900561.4.
First Chinese Office Action Application No. 201810577873.7; dated Apr. 1, 2019.

* cited by examiner

DAMPER POSITION-LIMITING DEVICE, TOWER AND WIND TURBINE

CROSS-REFERENCE TO RELATED APPLICATIONS

This application is the national phase of International Application No. PCT/CN2018/106209, titled "DAMPER POSITION-LIMITING DEVICE, TOWER AND WIND TURBINE", filed on Sep. 18, 2018, which claims the benefit of priority to Chinese Patent Application No. 201810577873.7, titled "DAMPER POSITION-LIMITING DEVICE, TOWER AND WIND TURBINE", filed with the State Intellectual Property Office of People's Republic of China on Jun. 7, 2018, the entire disclosures thereof are incorporated herein by reference.

FIELD

The present application relates to wind power generating equipment, and in particular to a damper position-limiting device, a tower, and a wind turbine.

BACKGROUND

A tower is an important support mechanism in a wind turbine. In order to ensure the stability of the tower, it is necessary to avoid resonance between the tower and the external influence, in addition to continuously strengthening structural strength of the tower. For example, as for an off-shore wind turbine, the tower needs to stand up to the impact of waves, and in this case, it is required to void, resonance between the tower and the impact of waves.

A current conventional method for avoiding resonance of the tower is to mount a damper in the tower. In addition, in order to prevent the damper from colliding with an inner wall of the tower and damaging the structure of the tower when swinging, an anti-collision device is generally mounted in the tower. Generally, the anti-collision device includes a position-limiting ring, and the damper is correspondingly provided with an impacting plate. The impacting plate is restricted in the position-limiting ring to limit the swing amplitude of the impacting plate, thereby limiting the swing amplitude of the damper, and thus the damper can be prevented from directly colliding with the inner wall of the tower.

In an existing anti-collision device, generally, a plurality of beams is arranged on an outer ring of the position-limiting ring, and the position-limiting ring is connected to the inner wall of the tower through the beams. However, a connecting area between a single beam and the inner wall of the tower is small. The beam close to the colliding point has a large impact on the inner wall of the tower at the moment of colliding when the damper collides with the position-limiting ring, and the structure of the tower may be damaged after several collisions. Therefore, the existing anti-collision device cannot effectively prevent damages to the tower structure caused by impacts from the damper.

SUMMARY

According to an aspect of the present application, a damper position-limiting device is provided, which is mounted in a tower to limit the swing amplitude of a damper installed in the tower. The damper position-limiting device includes at least one web and a position-limiting ring. The web is provided with a mounting hole and at least one stress relief hole. A first side wall of the web has a first specified length along a circumferential direction of the inner wall of the tower, and is connected to the inner wall of the tower. The position-limiting ring is positioned within the mounting hole and connected to the mounting hole and is configured to accommodate an impacting plate of the damper.

According to another aspect of the present application, a tower is provided, which includes a damper and the damper position-limiting device as described above.

According to yet another aspect of the present application, a wind turbine is provided, which includes the tower as described above.

In an embodiment of the present application, the web of the damper position-limiting device is used as a connecting member between the inner wall of the tower and the position-limiting ring. When the impacting plate of the damper collides with the position-limiting ring, an impact force of the damper is transmitted to the inner wall of the tower through the web. Since the first side wall of the web has the first specified length, the impact force is uniformly spread out along the length of the first side wall, thereby avoiding a case that a small local area on the inner wall of the tower is subjected to a large pressure and effectively preventing damages to the tower structure caused by impacts from the damper.

BRIEF DESCRIPTION OF DRAWINGS

The above and/or additional aspects and advantages of the present application will become obvious and easy to understand with reference to the following description of embodiments in conjunction with the drawings.

DETAILED DESCRIPTION OF EMBODIMENTS

Figure 1:
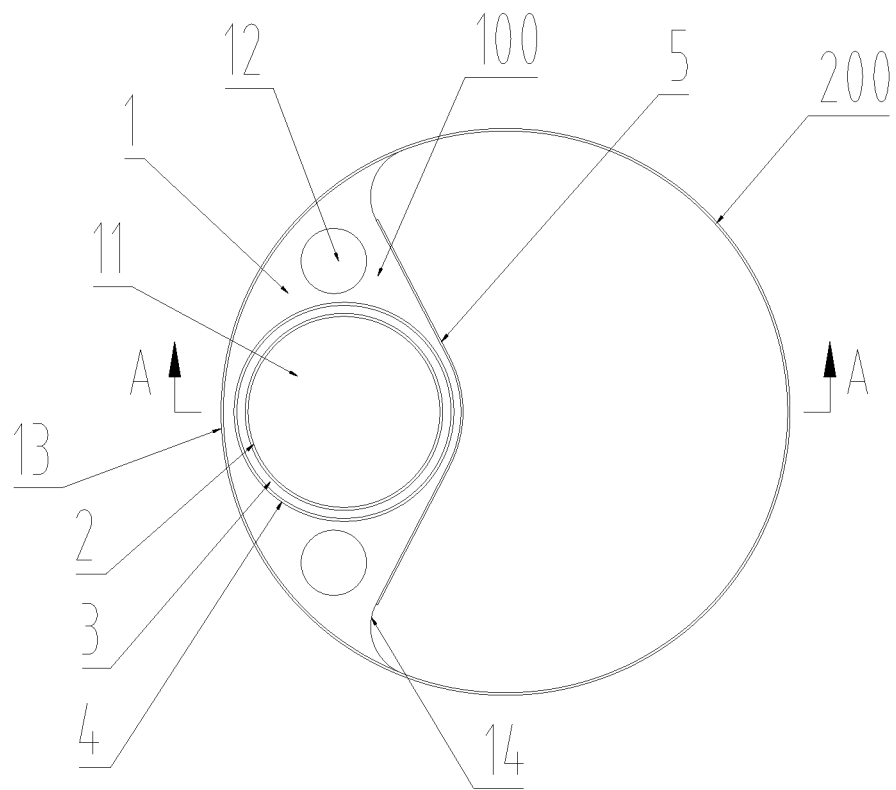
FIG. 1 is a schematic view showing the structure of a damper position-limiting device according to an embodiment of the present application.

The present application is described in detail below. Examples of the embodiments of the present application are illustrated in the drawings, where same or similar reference numerals are used to represent same or similar components or components having same or similar functions. The embodiments described below with reference to the drawings are illustrative and only for explaining the present application, and should not be construed as limitation to the present application.

It should be understood by those skilled in the art that all terms (including technical and scientific terms) used herein have the same meaning as commonly understood by one of ordinary skilled in the art to which the present application belongs, unless otherwise defined. It should also be understood that terms such as those defined in a general dictionary have the same meaning as that in the context of the prior art unless specifically defined, and should not be interpreted in an idealized or overly formal sense.

A damper position-limiting device is provided according to embodiments of the present application, which is mounted on an inner wall of a tower to limit the swing amplitude of a damper installed in the tower.

Figure 2:
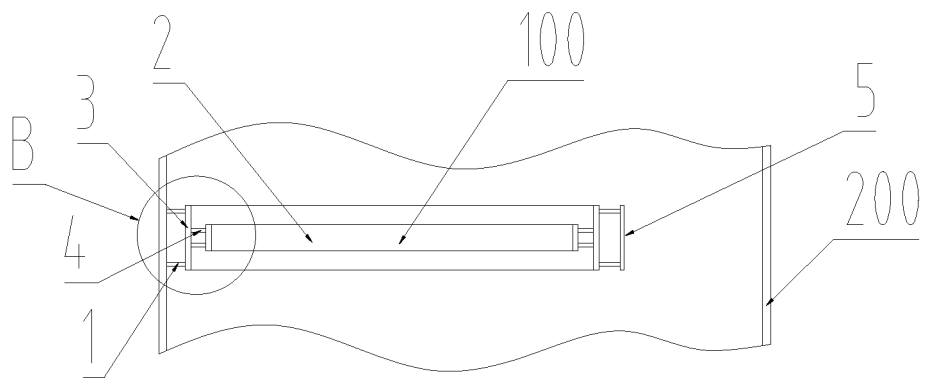
FIG. 2 is a sectional view of FIG. 1 taken along direction A.
Figure 3:
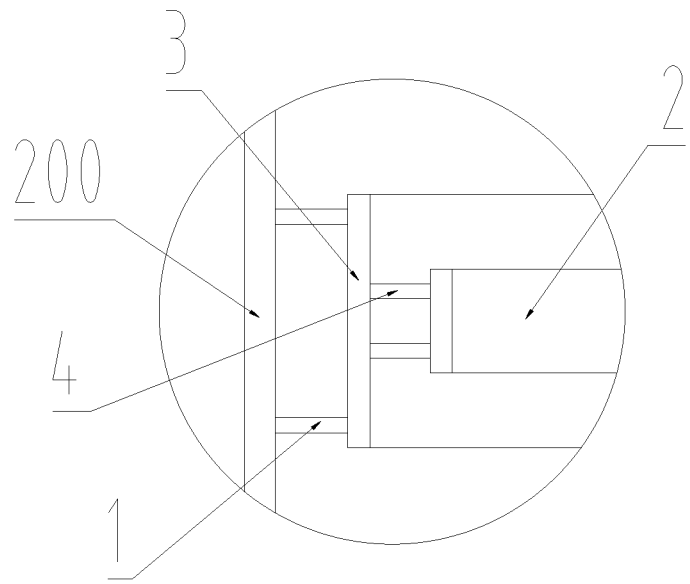
FIG. 3 is a partially enlarged view of an area B in FIG. 2.

FIG. 1 schematically shows the structure of a damper position-limiting device according to an embodiment of the present application, FIG. 2 is a sectional view of FIG. 1 taken along direction A, and FIG. 3 is a partially enlarged view of an area B in FIG. 2. As shown in FIGS. 1 to 3, the damper position-limiting device 100 includes at least one web 1 and a position-limiting ring 2. The web 1 is provided with a mounting hole 11 and at least one stress relief hole 12. The position-limiting ring 2 is positioned within the mounting hole 11 and connected to the mounting hole 11. A first side wall 13 of the web 1 has a first specified length along a circumferential direction of the inner wall of the tower 200, and is connected to the inner wall of the tower 200.

Figure 5:
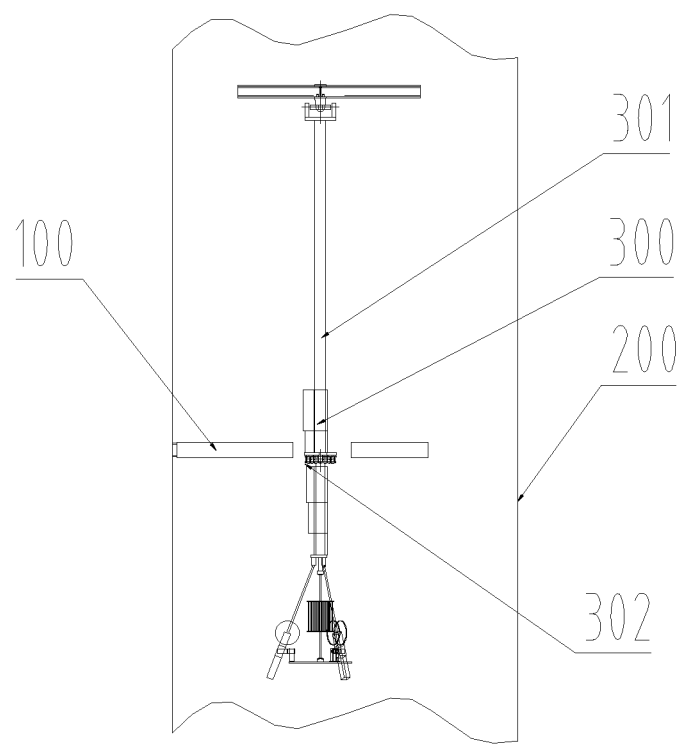
FIG. 5 is a schematic view showing the structure of a tower including a damper and the damper position-limiting device according to an embodiment of the present application.

Referring to FIG. 5, a boom 301 of the damper 300 may be provided with an impacting plate 302 and may pass through the position-limiting ring 2. The position-limiting ring 2 can accommodate the impacting plate 302 of the damper 300 and withstand the impact of the impacting plate 302. In use, the position-limiting ring 2 can limit the swing amplitude of the impacting plate 302, thereby limiting the swing amplitude of the damper 300 and preventing the damper 300 from directly colliding with the inner wall of the tower 200.

In the embodiments of the present application, the web 1 of the damper position-limiting device 100 is used as a connecting member between the inner wall of the tower 200 and the position-limiting ring 2. When the impacting plate 302 of the damper 300 collides with the position-limiting ring 2, an impact force of the damper 300 is transmitted to the inner wall of the tower 200 through the web 1. Since the first side wall 13 of the web 1 has the first specified length, the impact force will be uniformly spread out along the length direction of the first side wall 13, thereby avoiding a case that a small local area on the inner wall of the tower 200 is subjected to a large pressure and effectively preventing structural damages to the tower 200 caused by impacts from the damper 300.

In order to avoid the case that a small local area on the inner wall of the tower 200 is subjected to a large pressure, the first side wall 13 of the web 1 may be attached to the inner wall of the tower 200. Optionally, the web 1 may be connected to the tower 200 by welding, bonding, or other manners in the embodiments of the present application.

Specifically, the web 1 is connected to the tower 200 by welding in the embodiment of the present application. In order to prevent the welding stress between the web 1 and the tower 200 from causing a change in the shape of the tower 200 and/or the structural damages on the web 1, the stress relief hole 12 may be provided in the web 1 in the embodiment of the present application. The stress relief hole 12 can weaken the strength of the web 1 in its surrounding areas, making the web 1 in these areas flexible. When the welding stress is generated, areas of the web 1 surrounding the stress relief hole 12 may be deformed to release the stress, thereby preventing the shape change of the tower 200 and/or the structural damage of the web 1 due to a welding stress concentration.

Optionally, the web 1 is a plate having a specified thickness and being made of a material having a specified strength, and the overall rigidity of the web 1 is smaller than the rigidity of the inner wall of the tower. The size and number of the stress relief hole 12 and the arrangement thereof in the web 1 can be appropriately designed according to the actual material strength and actual thickness of the web 1, to ensure that areas of the web 1 surrounding the stress relief hole 12 has flexibility and can be deformed when the welding stress is generated. Further, in a case that the overall rigidity of the web 1 is smaller than the rigidity of the inner wall of the tower, when the damper position-limiting device 100 is hit by the damper 300, the web 1 having the smaller rigidity is first deformed to absorb a large amount of kinetic energy, thereby greatly reducing the influence of the impact on the inner wall of the tower.

Optionally, in an embodiment of the present application, the first side wall 13 of the web 1 may have an arc shape and may match with a specified periphery of the inner wall of the tower 200 at a specified height. The first side wall 13 designed in an arc shape facilitates uniformly dispersing the impact force of the damper 300.

It should be noted that the tower 200 may be in a funnel-shape which gradually contracts from bottom to top (that is, radii of the circumferences of the inner wall at different heights are different), and the web 1 may be mounted at different positions on the inner wall of the tower 200 according to actual needs. In the embodiments of the present application, the specified height in the tower 200 refers to an actual installation height of the web 1 within the tower 200.

Optionally, in the embodiments of the present application, the first specified length of the first side wall 13 of the web 1 may be 0.25 to 0.5 times a circumference of the specified periphery of the inner wall. Therefore, in a case that the first side wall 13 is welded to the inner wall of the tower 200, a length of a weld seam between the web 1 and the inner wall of the tower 200 may be 0.25 to 0.5 times the circumference of the specified periphery of the inner all. The first specified length of the first side wall 13 is not less than 0.25 times the circumference of the specified periphery of the inner wall, which ensures enough connection strength between the web 1 and the inner wall of the tower 200, thereby preventing the web 1 from falling off. The first specified length of the first side wall 13 is not greater than 0.5 times the circumference of the specified periphery of the inner wall, to avoid a large welding stress caused by the overlong weld seam between the web 1 and the inner wall of the tower 200, thereby preventing the shape change of the tower 200 and/or the structural damage of the web 1 due to the overlarge stress.

In addition, some errors may be generated during manufacture, assembly, and/or installation of the damper position-limiting device 100 according to the embodiments, and these errors may cause an actual position of the position-limiting ring 2 in the axial direction of the tower 200 to deviate from a theoretical position, so that the impacting plate 302 of the damper 300 may not come into contact with the position-limiting ring 2 at a preset position, which may cause a risk of the impacting plate directly hitting the inner wall of the tower 200. In order to avoid the above cases, the position-limiting ring 2 may be designed in a cylindrical shape and may have a second specified length in the axial direction of the tower 200. The second specified length of the position-limiting ring 2 can compensate for the positional deviation of the position-limiting ring 2 in the axial direction of the tower 200 due to the above errors, and ensure that the impacting plate 302 comes into contact with the position-limiting ring 2 at the preset position, thereby preventing the damper 300 from directly colliding with the inner wall of the tower 200. The second specified length can be predetermined according to actual needs.

Optionally, in the embodiments of the present application, an inner side of the position-limiting ring 2 may be provided with a damping ring. The damping ring can buffer the impact of the damper 300, and prevent the position-limiting ring 2 and the impacting plate 302 of the damper 300 from being damaged. Optionally, the damping ring may be made of a rubber material.

Figure 4:
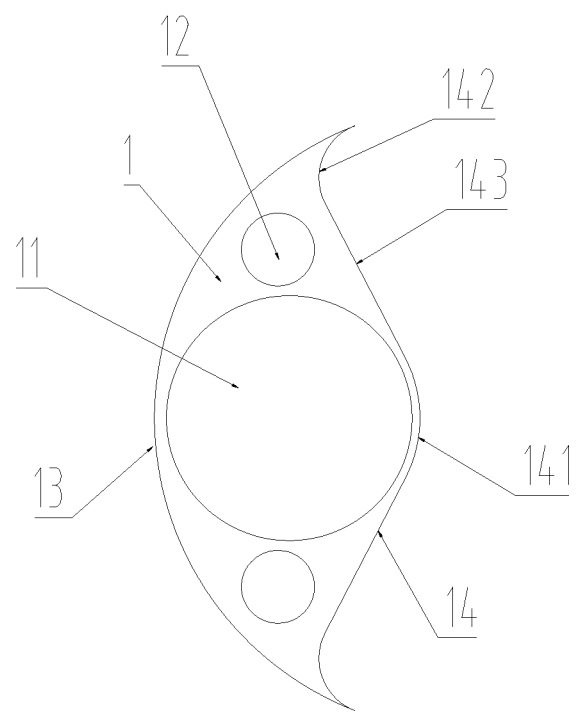
FIG. 4 is a schematic view showing the structure of a web of the damper position-limiting device according to the embodiment of the present application.

Optionally, in the embodiments of the present application, as shown in FIG. 4, the web 1 may be symmetrical with respect to a first normal plane containing the geometric center of the mounting hole 11. Specifically, the mounting hole 11 of the web 1 may have a circular shape, and the first normal plane is a normal plane on which a diameter line of the mounting hole 11 is located. The web 1 designed as a symmetrical structure can ensure that the welding stresses on both sides of the first normal plane are balanced as much as possible, which helps to avoid the stress concentration.

Optionally, in the embodiments of the present application, the number of the stress relief holes 12 may be an even number, and two sets of the stress relief holes 12 with the same number may be symmetrical with respect to the first normal plane. Specifically, as shown in FIG. 4, two stress relief holes 12 may be provided, which are respectively located at two sides of the first normal plane.

Optionally, in the embodiments of the present application, the web 1 may have a second side wall 14, as shown in FIG. 4. The second side wall 14 may include at least three curved segments, and centers of curvature of the curved segments are respectively located at opposite sides of the second side wall 14. Both the first side wall 13 and the second side wall 14 of the web 1 may be symmetrical with respect to the first normal plane. Specifically, the second side wall 14 may include a first curved surface 141, two second curved surfaces 142, and two transitional surfaces 143. The two second curved surfaces 142 may be respectively located at two sides of the first curved surface 141. The center of curvature of the first curved surface 141 may be located at one side of the second side wall 14, while the centers of curvature of the two second curved surfaces 142 may be located at the other side of the second side wall 14.

The two second curved surfaces 142 may be respectively connected to two ends of the first side wall 13, and each of the second curved surfaces 142 may be smoothly connected to the first curved surface 141 through the corresponding transitional surface 143. This can be understood as that the second side wall 14 is a smooth curved surface, that is, there is no sharp corner on the second side wall 14, thereby avoiding tearing of the web 1 at the sharp corner due to stress concentration at the sharp corner.

The arrangement of the second side wall 14 may be designed according to the diameters and arrangement of the mounting hole 11 and the stress relief hole 12 to minimize a surface area of the web 1. Optionally, in the embodiments of the present application, the diameter of the mounting hole 11 may be greater than the diameter of the stress relief hole 12, and the center of curvature of the curved segment of the second side wall 14 corresponding to the mounting hole 11 may be located within the web 1. Specifically, as shown in FIG. 4, the first curved surface 141 corresponds to the mounting hole 11, and the center of curvature of the first curved surface 141 is located within the web 1, and the centers of curvature of the two second curved surfaces 142 are located outside the second side wall 14. This can be understood as that the second curved surfaces 142 are recessed toward an inner side of the web 1 to be adjacent to the stress relief holes 12, and the first curved surface 141 protrudes toward an outer side of the web 1 to include the mounting hole 11 inside the first curved surface 141.

Optionally, in the embodiments of the present application, the damper position-limiting device 100 may include at least two stacked webs 1, wherein a side wall of the mounting hole 11 of each web 1 is connected to the position-limiting ring 2, as shown in FIGS. 2 and 3.

Optionally, in the embodiments of the present application, the damper position-limiting device 100 may further include a reinforcing cylinder 3, as shown in FIGS. 2 and 3. The reinforcing cylinder 3 is located between the mounting hole 11 of the web 1 and the position-limiting ring 2, the side wall of the mounting hole 11 of each web 1 is connected to an outer wall of the reinforcing cylinder 3, and the position-limiting ring 2 is connected to an inner wall of the reinforcing cylinder 3. The reinforcing cylinder 3 can connect the position-limiting ring 2 with a plurality of webs 1 to form an entirety.

Optionally, in the embodiments of the present application, the damper position-limiting device 100 may further include at least one reinforcing annular plate 4, as shown in FIGS. 2 and 3. Each reinforcing annular plate 4 is located between the reinforcing cylinder 3 and the position-limiting ring 2, and connects the inner wall of the reinforcing cylinder 3 with the position-limiting ring 2.

Specifically, in the embodiments of the present application, as shown in FIG. 3, the reinforcing cylinder 3, the reinforcing annular plate 4, and the position-limiting ring 2 in the mounting hole 11 of the web 1 may be sequentially connected from the outside to the inside. When the impacting plate 302 of the damper 300 collides with the position-limiting ring 2, the impact force of the damper 300 is transmitted to the reinforcing cylinder 3 through the reinforcing annular plate 4, and is uniformly spread out along a circumferential direction of the reinforcing annular plate 4. The impact force is further transmitted through the web 1 to the inner wall of the tower 200. Since the first side wall 13 of the web 1 has the first specified length, the impact force is again uniformly spread out along the length direction of the first side wall 13, thereby avoiding a case that a small local area on the inner wall of the tower 200 is subjected to a large pressure and effectively preventing structural damages to the tower 200 caused by impacts from the damper 300.

Optionally, in the embodiments of the present application, the damper position-limiting device 100 may further include a reinforcing side plate 5, as shown in FIGS. 1 and 2. The reinforcing side plate 5 can be connected to the second side wall 14 of each of the at least two webs 1 to ensure the stability of the connection between the webs 1.

Optionally, in the embodiments of the present application, the mounting hole 11 of the web 1 may be circular, the reinforcing cylinder 3 and the position-limiting ring 2 may be cylindrical, and the reinforcing annular plate 4 may be ring-shaped. This configuration helps to spread out the impact force of the damper 300.

It should be noted that, in the embodiments of the present application, the first side wall 13 of the web 1 of the damper position-limiting device 100 may be connected to the tower 200, and the second side wall 14 may be suspended. Therefore, when the impact force of the damper 300 is directed to the first side wall 13 of the web 1, the tower 200 is subjected to a pressure; and when the impact force of the damper 300 is directed to the second side wall 14 of the web 1, the tower 200 is subjected to a tensile force. Hereinbefore, taking a case in which the impact force of the damper 300 is directed to the first side wall 13 of the web 1 as an example, the principle and technical effects of the damper position-limiting device 100 scattering the impact force according to the embodiments of the present application are specifically described. Based on this, those skilled in the art will readily appreciate that the damper position-limiting device 100 according to the embodiments of the present application also has a function of scattering the impact force when the impact force of the damper 300 is directed to the second side wall 14 of the web 1.

Figure 6:
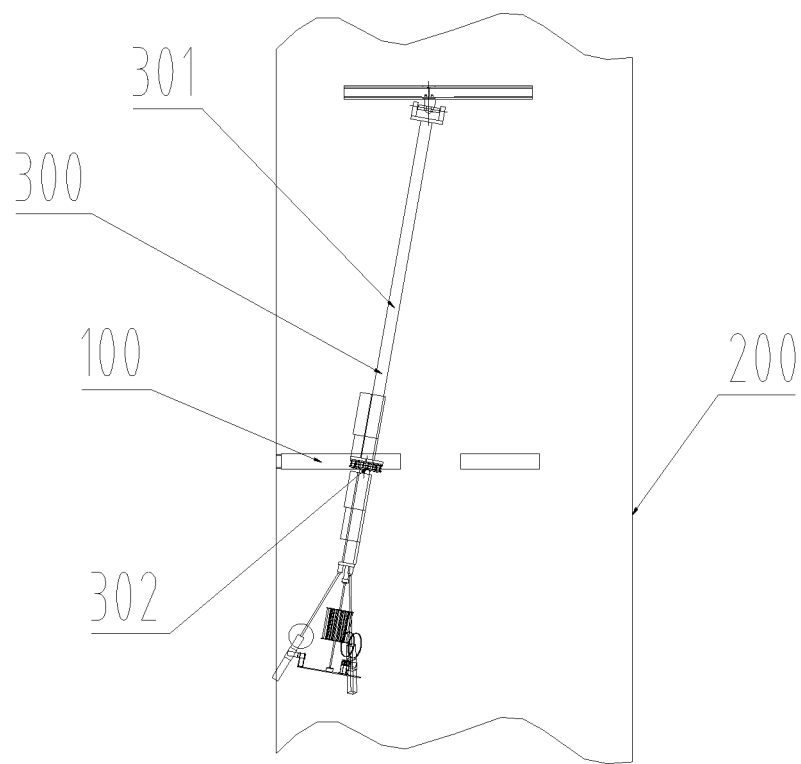
FIG. 6 is a schematic view showing the structure of the tower when the damper swings to an extreme position according to the embodiment of the present application.
Figure 7:
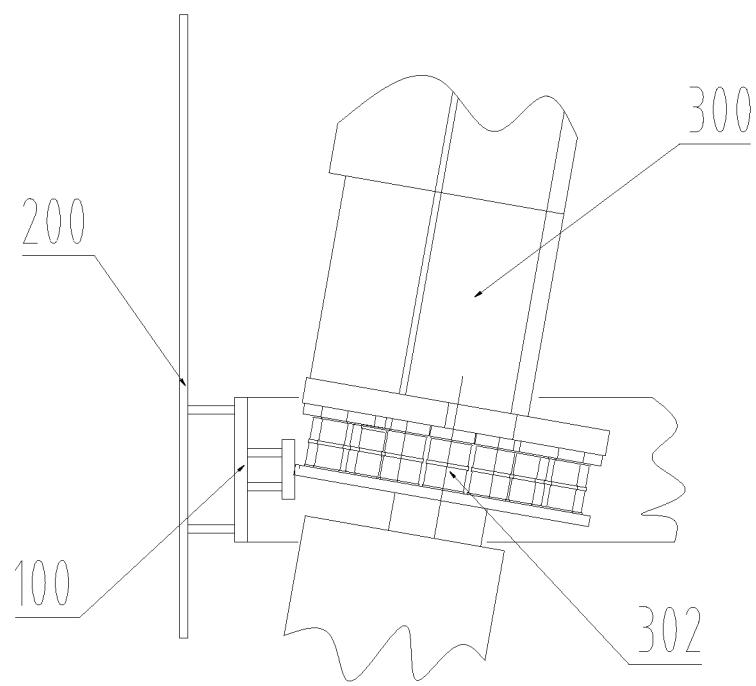
FIG. 7 is a partially enlarged view of FIG. 6.

Based on the same inventive concept, a tower is further provided according to an embodiment of the present application. As shown in FIG. 5, the tower 200 may include the damper position-limiting device 100 according to the above-described embodiments of the present application and a damper 300. FIG. 6 schematically shows the structure of the tower 200 when the damper 300 swings to an extreme position according to an embodiment of the present application. FIG. 7 is a partially enlarged view of FIG. 6. As shown in FIG. 7, when the damper 300 swings to the extreme position, the impacting plate 302 of the damper 300 may collide with the position-limiting ring 2 of the damper position-limiting device 100.

Based on the same inventive concept, a wind turbine is further provided according to an embodiment of the present application, which includes a tower 200 according to the above-described embodiments of the present application.

The various embodiments of the present application described herein are merely exemplary rather than limitative. A person skilled in the art will readily appreciate that various variations and modifications can be made without departing from the principle of the present application, and such variations and modifications should be considered to fall within the scope of the present application.

The invention claimed is:

1. A damper position-limiting device, configured to be mounted in a tower to limit a swing amplitude of a damper mounted in the tower, comprising at least one web and a position-limiting ring, wherein
   the web has a mounting hole and at least one stress relief hole;
   a first side wall of the web has a first specified length along a circumferential direction of an inner wall of the tower, and is connected to the inner wall of the tower; and
   the position-limiting ring is positioned within the mounting hole and connected to the mounting hole and is configured to accommodate an impacting plate of the damper,
   wherein the first specified length of the first side wall is 0.25 to 0.5 times a circumference of a specified periphery of the inner wall, the first side wall matching with the specified periphery of the inner wall at a specified height.

2. The damper position-limiting device according to claim 1, wherein the first side wall is in the shape of a circular arc.

3. The damper position-limiting device according to claim 1, wherein the position-limiting ring has a cylindrical shape and has a second specified length in an axial direction of the tower, and/or
   an inner side of the position-limiting ring is provided with a damping ring.

4. The damper position-limiting device according to claim 1, wherein the web is a plate having a specified thickness and being made of a material having a specified strength, and an overall rigidity of the web is smaller than an rigidity of the inner wall of the tower.

5. The damper position-limiting device according to claim 1, wherein the web is symmetrical with respect to a first normal plane containing a geometric center of the mounting hole.

6. The damper position-limiting device according to claim 5, wherein the number of the at least one stress relief hole is an even number, and two sets of the stress relief holes of the same number are symmetrical with respect to the first normal plane.

7. The damper position-limiting device according to claim 5, wherein a second side wall of the web comprises at least three curved segments, and centers of curvature of the at least three curved segments are respectively located at opposite sides of the second side wall; and
   both the first side wall and the second side wall are symmetrical with respect to the first normal plane.

8. The damper position-limiting device according to claim 7, wherein a diameter of the mounting hole is greater than a diameter of the stress relief hole, and the center of curvature of the curved segment of the second side wall corresponding to the mounting hole is located within the web.

9. The damper position-limiting device according to claim 1, wherein at least two webs are stacked, and a side wall of the mounting hole of each of the webs is connected to the position-limiting ring.

10. The damper position-limiting device according to claim 9, further comprising a reinforcing cylinder, wherein the reinforcing cylinder is located between the mounting holes of the webs and the position-limiting ring; the side wall of the mounting hole of each of the webs is connected to an outer wall of the reinforcing cylinder; and the position-limiting ring is connected to an inner wall of the reinforcing cylinder.

11. The damper position-limiting device according to claim 10, further comprising at least one reinforcing annular plate, wherein
   each of the at least one reinforcing annular plate is located between the reinforcing cylinder and the position-limiting ring, and connects the inner wall of the reinforcing cylinder with the position-limiting ring.

12. The damper position-limiting device according to claim 9, further comprising a reinforcing side plate, wherein the second side wall of each of the webs is connected to the reinforcing side plate.

13. A tower, comprising the damper position-limiting device according to claim 1 and a damper.

14. A wind turbine, comprising the tower according to claim 13.

15. The damper position-limiting device according to claim 2, wherein at least two webs are stacked, and a side wall of the mounting hole of each of the webs is connected to the position-limiting ring.

16. The damper position-limiting device according to claim 3, wherein at least two webs are stacked, and a side wall of the mounting hole of each of the webs is connected to the position-limiting ring.

17. The damper position-limiting device according to claim 4, wherein at least two webs are stacked, and a side wall of the mounting hole of each of the webs is connected to the position-limiting ring.

18. The damper position-limiting device according to claim 5, wherein at least two webs are stacked, and a side wall of the mounting hole of each of the webs is connected to the position-limiting ring.

* * * * *